US012638150B2

(12) United States Patent
Drezet et al.

(10) Patent No.: US 12,638,150 B2
(45) Date of Patent: May 26, 2026

(54) MOTOR VEHICLE ILLUMINATION SYSTEM PROVIDED WITH A LIGHTING MODULE ABLE TO EMIT A PIXELLATED LIGHT BEAM

(71) Applicant: VALEO VISION, Bobigny Cedex (FR)

(72) Inventors: Matthieu Drezet, Bobigny Cedex (FR); Sebastien Roels, Bobigny Cedex (FR); Marie Pellarin, Angers (FR)

(73) Assignee: VALEO VISION, Bobigny Cedex (FR)

( * ) Notice: Subject to any disclaimer, the term of this patent is extended or adjusted under 35 U.S.C. 154(b) by 170 days.

(21) Appl. No.: 18/262,138

(22) PCT Filed: Jan. 21, 2022

(86) PCT No.: PCT/EP2022/051404
§ 371 (c)(1),
(2) Date: Jul. 19, 2023

(87) PCT Pub. No.: WO2022/157339
PCT Pub. Date: Jul. 28, 2022

(65) Prior Publication Data
US 2024/0084992 A1 Mar. 14, 2024

(30) Foreign Application Priority Data

Jan. 22, 2021 (FR) ..................................... 21 00601

(51) Int. Cl.
| | |
|---|---|
| *F21S 41/657* | (2018.01) |
| *B60Q 1/06* | (2006.01) |
| *B60Q 1/14* | (2006.01) |

(52) U.S. Cl.
CPC .............. *F21S 41/657* (2018.01); *B60Q 1/06* (2013.01); *B60Q 1/1415* (2013.01); *B60Q 2200/30* (2013.01); *B60Q 2300/056* (2013.01)

(58) Field of Classification Search
CPC ...... F21S 41/657; F21S 41/143; F21S 41/153; F21S 41/663; B60Q 1/06; B60Q 1/1415;
(Continued)

(56) References Cited

U.S. PATENT DOCUMENTS

| | | | | |
|---|---|---|---|---|
| 11,454,365 B2 * | 9/2022 | Marchal | .................. | F21S 41/29 |
| 2015/0377442 A1 * | 12/2015 | Bhakta | .................... | F21S 41/25 |
| | | | | 362/516 |

(Continued)

FOREIGN PATENT DOCUMENTS

| | | | | |
|---|---|---|---|---|
| EP | 3689678 A1 * | 8/2020 | .......... | B60Q 1/0041 |
| FR | 3079467 A1 * | 10/2019 | .............. | B60Q 1/18 |

(Continued)

OTHER PUBLICATIONS

Japanese Office Action issued Aug. 27, 2024 in Japanese Patent Application No. 2023-544433 (with English summary), 6 pages.

(Continued)

*Primary Examiner* — Abdullah A Riyami
*Assistant Examiner* — Syed M Kaiser
(74) *Attorney, Agent, or Firm* — Oblon, McClelland, Maier & Neustadt, L.L.P.

(57) ABSTRACT

An illumination system of a motor vehicle includes a first lighting module that is able to emit a first light beam with an upper cut-off, a second lighting module that is able to emit a second, pixelated light beam, and a system for mechanically adjusting the vertical orientation of the first and second light beams. A controller is able to receive an emission instruction for a given lighting function and is designed to control the adjusting system in order to bring about a simultaneous modification of the vertical orientation of the first and second light beams on the basis of the instruction and to control the second lighting module to emit a second, (Continued)

pixelated light beam having predetermined characteristics on the basis of said instruction.

20 Claims, 2 Drawing Sheets

(58) Field of Classification Search
CPC .......... B60Q 2200/30; B60Q 2300/056; B60Q 2300/112; B60Q 2400/50; B60Q 1/115
See application file for complete search history.

(56) References Cited

U.S. PATENT DOCUMENTS

| | | | | |
|---|---|---|---|---|
| 2016/0347237 | A1* | 12/2016 | Bhakta | .................. F21S 41/255 |
| 2018/0086254 | A1* | 3/2018 | Morel | ...................... B60Q 1/04 |
| 2018/0099605 | A1 | 4/2018 | Ahn et al. | |

| | | | | |
|---|---|---|---|---|
| 2020/0180504 | A1* | 6/2020 | Kim | ...................... F21S 41/285 |
| 2021/0070219 | A1* | 3/2021 | Roels | .................... F21S 41/143 |
| 2022/0203883 | A1* | 6/2022 | Prat | ......................... B60Q 1/143 |
| 2022/0412530 | A1* | 12/2022 | Mimoun | ............... F21S 41/663 |

FOREIGN PATENT DOCUMENTS

| | | | |
|---|---|---|---|
| FR | 3 082 471 A1 | 12/2019 | |
| JP | 2010-137693 A | 6/2010 | |
| JP | 2015-230768 A | 12/2015 | |
| JP | 2019-204772 A | 11/2019 | |
| WO | WO-2019103349 A1 * | 5/2019 | ............... B60Q 1/08 |

OTHER PUBLICATIONS

International Search Report issued Apr. 5, 2022 in PCT/EP2022/051404, filed on Jan. 21, 2022, 2 pages.

* cited by examiner

[Fig. 1]
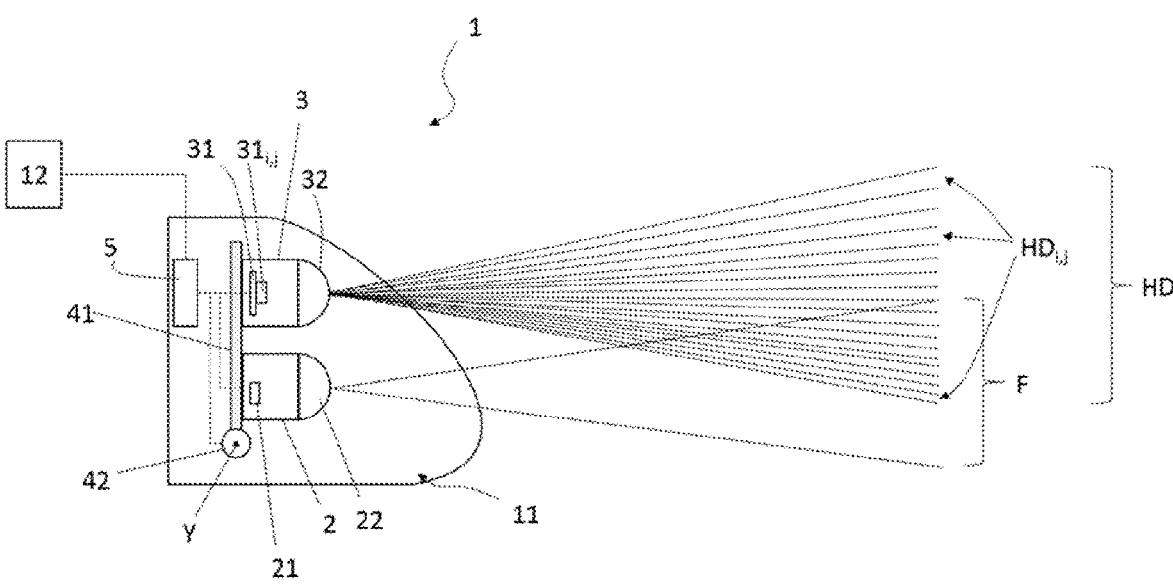
[Fig. 2]
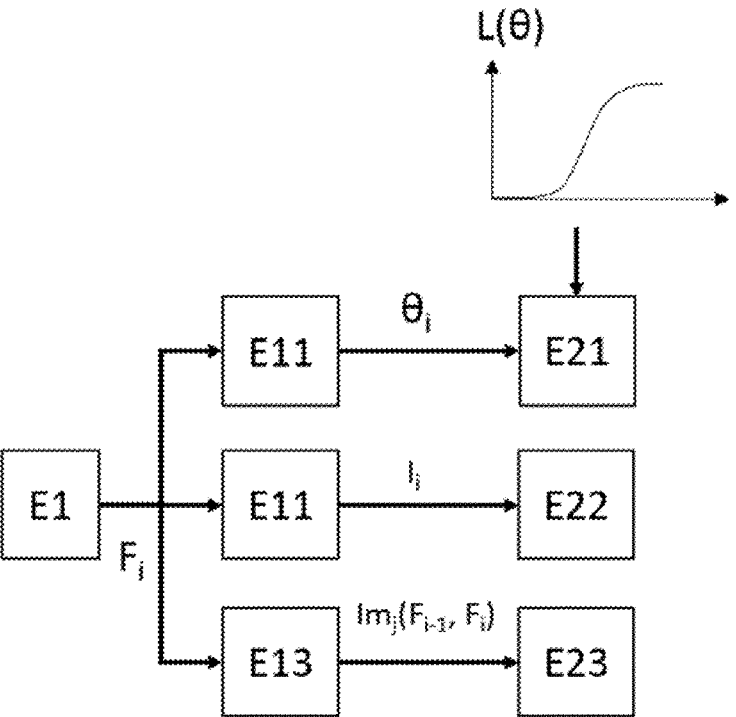

[Fig. 3]
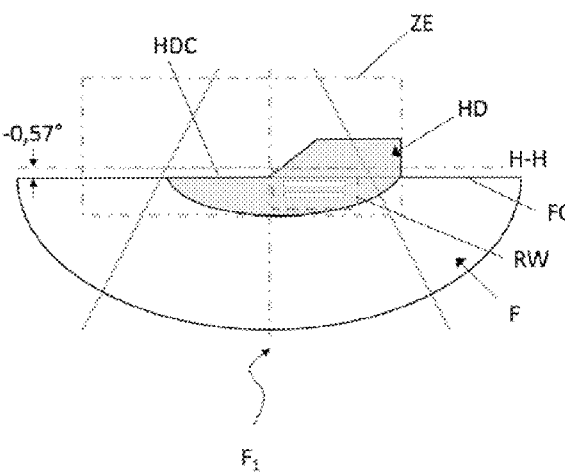
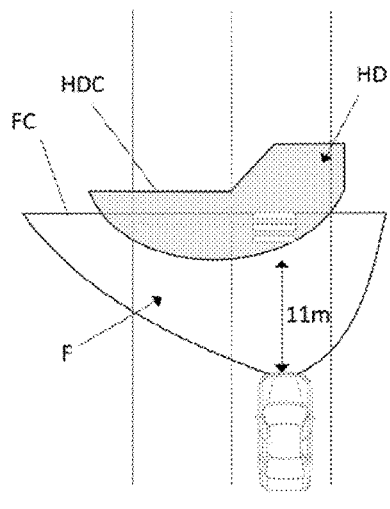
[Fig. 4]
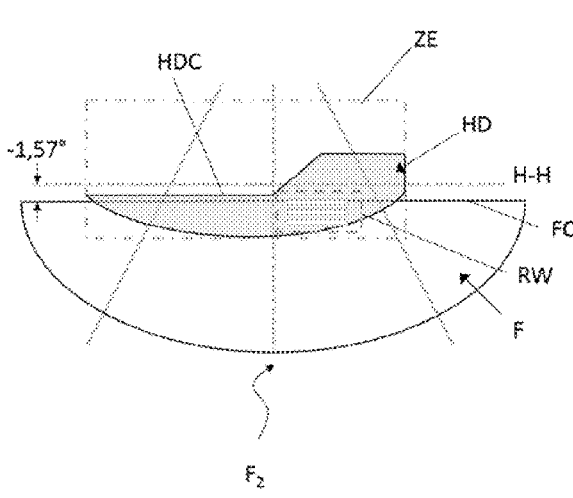
[Fig. 5]
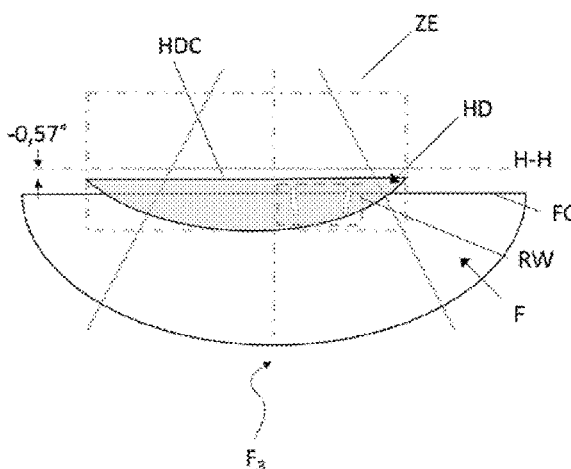
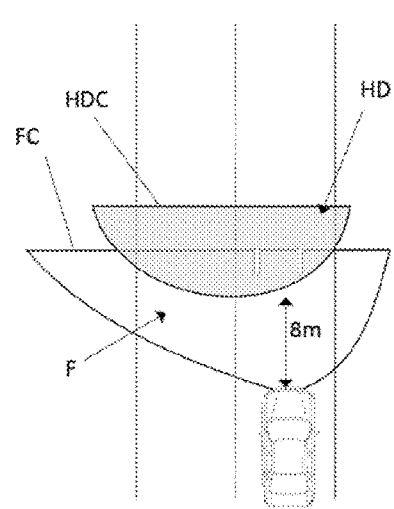

MOTOR VEHICLE ILLUMINATION SYSTEM PROVIDED WITH A LIGHTING MODULE ABLE TO EMIT A PIXELLATED LIGHT BEAM

The invention relates to the field of motor vehicle lighting. More specifically, the invention relates to a motor vehicle lighting system equipped with a light module which is able to emit a pixelated light beam.

In the field of motor vehicle lighting, it is known practice to employ light modules comprising enough light sources which may be activated selectively, referred to as elementary, associated with an optical device, to make it possible to realize pixelated light functions, for example, containing at least 500 pixels, each pixel being formed by an elementary light beam emitted by one of the elementary light sources. This type of module makes it possible, for example, to realize, in particular, anti-dazzle high-beam lighting functions, in which some pixels of the high beam are turned off or attenuated for a target vehicle being followed or passed, ground writing lighting functions, in which some pixels of a low beam are overbrightened or attenuated in order to display a pictogram, ground marking lighting functions, in which some pixels of the low beam are overbrightened or attenuated in order to materialize markings such as lines, or indeed welcome scenario lighting functions, in which some pixels of a light beam which is intended to be projected onto the ground or onto a wall are overbrightened or attenuated in order to display a pictogram upon unlocking and/or starting of the vehicle.

In order to control this type of module, a central computer receives information from various sensors, such as a camera filming the road, a steering wheel angle sensor, or a navigation system, determines which type of pixelated light function should be emitted by the module, and periodically sends an instruction to emit this desired function to the module. The instructions sent by the computer generally contain the type of function and the associated parameters, such as, for example, the position of a vehicle not to be dazzled. A controller, each time it receives an emission instruction, defines, for each elementary light source, the light intensity which this light source should emit so that the elementary beam which it may emit realizes the pixel required to realize the desired pixelated light function.

A disadvantage of this type of light module is the emission area on the road which it is capable of addressing. Specifically, the resolution and the dimensions of this emission area are directly linked to the number of elementary light sources which this light module employs. In order to maintain a reasonable optical, electronic and mechanical complexity as well as an acceptable cost, it is thus necessary to limit the dimensions of this emission area. However, the location on the road of the emission area required to realize the various light functions which are mentioned above, or even to realize the same function according to various traffic parameters, varies. It is for this purpose that, as, for example, described in the document DE 10 2016 122 043, adjusting the vertical orientation of the light module at the same time as the pixelated light function which it emits has been imagined. Various emission areas may thus be reached by changing the vertical orientation of the light module.

Although this solution has undeniable advantages, it is not satisfactory from the point of view of integrating the light module into a headlamp of a motor vehicle.

Specifically, such a light module is generally not used alone but in combination with other lighting modules, and in particular a lighting module which may emit a lighting beam having a flat upper cutoff. The combination of these two modules makes it possible, among other things, to realize a regulatory high-beam function, by controlling the light module so as to emit a pixelated light function also having an upper cutoff. However, if the vertical orientation of this light module is modified, the light distribution of the overall beam emitted by the two light modules is thus modified, which may not meet the regulatory requirements of a low beam.

There is thus a need for a motor vehicle lighting system incorporating a first light module which may emit a lighting beam having an upper cutoff and a second light module which may emit a pixelated lighting beam, the vertical orientation of which it is possible to adjust while at the same time maintaining the ability of the lighting system to emit regulatory light functions.

The present invention falls within this context and aims to address this need.

To these ends, one subject of the invention is a lighting system of a motor vehicle, comprising a first light module which is able to emit a first lighting beam with an upper cutoff, a second light module which is able to emit a second, pixelated lighting beam, a system for mechanically adjusting the vertical orientation of the first and second light beams and a controller which is able to receive an instruction to emit a given light function and arranged to control the adjustment system so as to cause a simultaneous modification of the vertical orientation of the first and second lighting beams depending on said instruction and to control the second light module so as to emit a second, pixelated lighting beam having predetermined characteristics depending on said instruction.

According to the invention, the first light module is able to emit a second, pixelated lighting beam in an emission area, the position of the emission area thus being defined by the vertical orientation of the second lighting beam. In other words, the simultaneous modification of the vertical orientation of the first and second lighting beams makes it possible to simultaneously move, on the one hand, the position of the upper cutoff of the first lighting beam and, on the other hand, the emission area of the second, pixelated lighting beam. It is then possible to define, simultaneously with these movements, the characteristics of the second, pixelated lighting beam in order to take into account both the position of this upper cutoff and of this emission area, in particular in order that the overall beam, formed by the meeting of the first and second lighting beams, satisfies the regulatory requirements surrounding the realization of said given light function.

What is meant by "pixelated light beam" is a beam composed of a plurality of pixels which are arranged in a plurality of rows and/or columns. This beam has a resolution defined, in particular, depending on the dimensions of each pixel and on the dimension of the emission area associated with this beam. Advantageously, the first lighting beam may be a first, pixelated or non-pixelated lighting beam. Where applicable, the resolution of the second, pixelated lighting beam, in particular its vertical resolution and/or its horizontal resolution, may be greater than that of the first lighting beam. For example, the upper cutoff of the first lighting beam is a substantially flat cutoff.

Advantageously, the first and second light modules may be arranged so that the second, pixelated lighting beam at least partially covers the first lighting beam, in particular so that the emission area of the second lighting beam extends below and above the upper cutoff of the first lighting beam.

The second, pixelated lighting beam may thus realize various functions, and in particular, alternatively or cumulatively:

a. A low-beam lighting function for which the pixels of the second lighting beam are controlled so as to form part of an upper cutoff of the overall beam formed by the meeting of the first and second lighting beams, a portion of this upper cutoff being or not being aligned with the upper cutoff of the first lighting beam, the upper cutoff of the second lighting beam thus forming, alone or in combination with the upper cutoff of the first lighting beam, a regulatory low-beam cutoff;

b. A non-dazzling high-beam lighting function for which pixels of the second lighting beam, which are located above the upper cutoff of the first lighting beam, are controlled to form a dark area in the overall beam formed by the meeting of the first and second lighting beams, the rest of the pixels remaining turned on, c. A ground writing function for which pixels of the second lighting beam, which are located below the upper cutoff of the first lighting beam and located in a display area, are controlled so as to materialize a pictogram or a marking on the ground, for example by negative or positive contrast, in the overall beam formed by the meeting of the first and second lighting beams.

According to the invention, the lighting system may comprise a computer which is able to issue instructions to emit a given light function, for example depending on traffic parameters of the motor vehicle, and in particular its speed and/or the presence of road users not to be dazzled, in particular detected by a sensor system of the motor vehicle. Where applicable, said instruction may comprise a type of light function to be emitted, and possibly a position of a display area of a pictogram or of a marking on the road and/or a position of an anti-dazzle dark area.

Advantageously, upon receipt of creation of said instruction to emit a given light function, the controller may be arranged to generate a digital image realizing a portion of said given light function in a frame, the dimensions and resolution of which correspond to those of the emission area of the second, pixelated lighting beam. Where applicable, the controller is arranged to control the second light module so as to emit the second, pixelated lighting beam, in the emission area, corresponding to the digital image generated, by turning on/turning off/controlling the light intensity of each of the elementary light sources of the second light module so that the elementary lighting beam which this source emits reproduces the associated pixel on the road.

In one embodiment of the invention, the first light module and the second light module are mounted on the same support plate, the mechanical adjustment system comprising an actuator which is connected to said support plate and able to cause a movement of the support plate, the controller being arranged to control, depending on said instruction, said actuator so as to cause a movement of the plate causing a simultaneous modification of the vertical orientation of the first and second lighting beams. What is meant by "movement of the support plate" is a rotation and/or a translation of the support plate making it possible to modify the vertical orientation of the first and second lighting beams. Where applicable, the controller is arranged to determine, on the basis of said instruction to emit a given light function received, a vertical angular movement setpoint for the vertical orientation of the first and second lighting beams and to control the mechanical adjustment system on the basis of this vertical angular movement setpoint. According to these features, it is thus possible to simplify the integration of the two modules into the same lighting system, by sharing the same actuator for adjusting the vertical orientation of the lighting beams.

In another embodiment of the invention, the mechanical adjustment system comprises a first actuator, which is connected to the first light module and able to cause a movement of the first light module, and a second actuator, which is connected to the second light module and able to cause a movement of the second light module, the controller being arranged to control, depending on said instruction, the first and second actuators, in particular synchronously, so as to cause a simultaneous movement of the first and second light modules causing a simultaneous modification of the vertical orientation of the first and second lighting beams.

Advantageously, the controller is arranged to control, depending on said instruction, the first light module so as to modify the light intensity of the first lighting beam according to a predetermined setpoint depending on said instruction. For example, the controller may be arranged to determine, on the basis of said instruction to emit a given light function received, a light intensity setpoint for the first lighting beam, for example as a percentage of the nominal light intensity of this first lighting beam, and to control the first light module so as to emit the first lighting beam according to this light intensity setpoint.

Advantageously, the second light module is able to emit a second, pixelated lighting beam in an emission area, and the controller is arranged to control, depending on said instruction, the second light module so as to emit a pixelated lighting beam, the profile, the photometry and/or the position in the emission area of which is predetermined depending on said instruction. As explained previously, the emission area has constant dimensions and a constant resolution, only its position on the road being modified by the mechanical movement of the second light module. For example, the controller may be arranged to control, depending on said instruction, the second light module so as to implement one or more of the following operations, sequentially or simultaneously:

a. Modifying the vertical and/or horizontal dimensions of the second lighting beam in the emission area, b. Adding, removing, moving and/or modifying the shape, the dimensions and/or the position of an upper cutoff of the second lighting beam in the emission area, c. Adding, removing, moving and/or modifying the shape, the dimensions and/or the position of a dark area in the second lighting beam in the emission area, d. Adding, removing, moving and/or modifying the shape, the dimensions and/or the position of a pictogram and/or of a marking on the ground in the second lighting beam in the emission area, e. Increasing or decreasing a local or overall light intensity of the second lighting beam in the emission area.

In one embodiment of the invention, the controller is, for example, able to selectively receive at least an instruction to emit a non-dazzling high-beam lighting beam, an instruction to emit a low-beam lighting beam and an instruction to emit an urban lighting beam. Where applicable:

a. Upon receipt of an instruction to emit a non-dazzling high-beam lighting beam, the controller is arranged to control the adjustment system so as to cause a simultaneous modification of the vertical orientation of the first and second lighting beams, so that the upper cutoff of the first lighting beam is positioned substantially at an angle of −0.57° with respect to a horizon line;

b. Upon receipt of an instruction to emit a low-beam lighting beam, the controller is arranged to control the adjustment system so as to cause a simultaneous modification of the vertical orientation of the first and second lighting beams, so that the upper cutoff of the first lighting beam is positioned substantially at an angle of −1.57° with respect to a horizon line;

c. Upon receipt of an instruction to emit an urban lighting beam, the controller is arranged to control the adjustment system so as to cause a simultaneous modification of the vertical orientation of the first and second lighting beams, so that the upper cutoff of the first lighting beam is positioned substantially at an angle of −2.57° with respect to a horizon line.

In the examples cited above, the position of the upper cutoff is understood, in particular, when the first lighting beam is projected onto a vertical screen positioned at a distance which is far enough from the first light module with regard to these dimensions, for example 25 meters. Moreover, these examples have been listed by way of indication, it being possible to envisage other functions without departing from the scope of the present invention, and in particular highway lighting or unfavorable meteorological condition lighting functions.

According to one example, upon receipt of an instruction to emit a non-dazzling high-beam lighting beam, the controller may, furthermore, be arranged to control the first light module so as to emit the first lighting beam according to a light intensity setpoint of 100% and to control the second light module so as to emit a second, pixelated lighting beam comprising an upper cutoff, said second, pixelated lighting beam extending horizontally only partially in the emission area, and the upper cutoff of the second lighting beam having a first, substantially flat portion aligned with the, in particular substantially flat, upper cutoff of the first lighting beam and a second, substantially flat portion positioned above the upper cutoff, the first and second portions being connected by a, in particular oblique, projection.

In an alternative example, upon receipt of an instruction to emit a non-dazzling high-beam lighting beam, the controller may, furthermore, be arranged to control the second light module so as to emit a second, pixelated lighting beam extending horizontally and vertically in the entirety of the emission area and comprising a dark area, for example framing a target object not to be dazzled.

According to one example, upon receipt of an instruction to emit a low-beam lighting beam, the controller may be arranged to control the first light module so as to emit the first lighting beam according to a light intensity setpoint of between 50% and 100% and to control the second light module so as to emit a second, pixelated lighting beam comprising an upper cutoff, said second, pixelated lighting beam extending horizontally entirely in the emission area, and the upper cutoff of the second lighting beam having a first, substantially flat portion positioned above the upper cutoff of the first lighting beam and a second, substantially flat portion positioned above the first portion, the first and second portions being connected by a, in particular oblique, projection.

According to one example, upon receipt of an instruction to emit an urban lighting beam, the controller may be arranged to control the first light module so as to emit the first lighting beam according to a light intensity setpoint of 50% and to control the second light module so as to emit a second, pixelated lighting beam comprising a substantially flat upper cutoff, said second, pixelated lighting beam extending horizontally entirely in the emission area, and the upper cutoff of the second lighting beam being positioned above the, in particular substantially flat, upper cutoff of the first lighting beam.

Advantageously, when the controller controls the second light module so as to emit a second, pixelated lighting beam, referred to as initial, having an upper cutoff, and receives an instruction to emit a new given light function, the controller may be arranged to control the second light module so as to emit a second, pixelated lighting beam having an upper cutoff, the position of which remains constant and identical to that of the initial second, pixelated lighting beam while it controls the adjustment system so as to cause a simultaneous modification of the vertical orientation of the first and second lighting beams depending on said instruction.

For example, the controller may be arranged to control the second light module so as to cause a movement of said upper cutoff in the second, pixelated lighting beam in an opposite direction to those of the movements of the first and second light beams due to the mechanical adjustment system, in particular so that the position and/or the speed of movement of this upper cutoff is subject to the position and/or to the speed of movement of these beams. It is understood that the movement of the upper cutoff is here a digital movement, and not a mechanical one, which may, for example, be implemented by the generation of a sequence of digital images by the controller in order to control the second light module during the control of the adjustment system and in which the position of this upper cutoff changes inversely to the movements of the lighting beams. By virtue of this feature, it is ensured that the position of the upper cutoff remains constant on the road, so as to avoid departing from the tolerance ranges provided for by regulation and to avoid making the movement of this upper cutoff noticeable to the driver, which might disturb them.

As a variant, provision may be made for this upper cutoff to change with a speed and/or a direction of movement which is different from those of the first and second lighting beams or indeed with a time shift with respect to the movements of these first and second lighting beams.

Advantageously, when the controller controls the second light module so as to emit a second, pixelated lighting beam, referred to as initial, and receives an instruction to emit a new given light function, in particular defining a new second, pixelated lighting beam, referred to as final, the controller is arranged to control the second light module so as to emit a second, pixelated lighting beam on the basis of a digital image obtained by a morphing and/or a translation of a digital image corresponding to the initial second, pixelated lighting beam, while it controls the adjustment system so as to cause a simultaneous modification of the vertical orientation of the first and second lighting beams depending on said instruction. Preferably, said morphing and/or said translation of the digital image may be a morphing and/or a translation toward a digital image corresponding to the final second, pixelated lighting beam. These features make it possible, among other things, to avoid a sudden modification of the overall beam emitted by the lighting system which would be noticeable to the driver.

Advantageously, upon receipt of an instruction to emit a given light function, the controller may be arranged to control, depending on said instruction, the adjustment system so as to cause a simultaneous modification of the vertical orientation of the first and second lighting beams according to a control law having a variable speed. For example, the control law may define an acceleration during a first time interval, referred to as the rise time, then a constant speed during a second time interval, then a deceleration during a third time interval, referred to as the fall time. These features also make it possible, alternatively or cumulatively, to avoid a sudden modification of the overall beam emitted by the lighting system which would be noticeable to the driver.

According to one exemplary embodiment of the invention, the first light module comprises at least a light source, a collector with a reflective surface configured to collect and reflect the light rays emitted by the light source into a light beam along an optical axis of the module, an optical device, in particular a lens, configured to project the light beam, the optical device being configured to form an image of the reflective surface of the collector and having a focal point, in particular a focal line, located at the rear of the collector, so as to image essentially the rear edge of its reflective surface, the upper cutoff of the first lighting beam being realized by this rear edge.

According to another exemplary embodiment of the invention, the first light module comprises at least a light source, a collector configured to collect and reflect the light rays emitted by the light source into a light beam along an optical axis of the module, an optical device, in particular a lens, configured to project the light beam and a shield which is arranged between the collector and the optical device and has a cutoff edge, the optical device having a focal point, in particular a focal line, located at the cutoff edge, so as to image essentially the cutoff edge, the upper cutoff of the first lighting beam being realized by this cutoff edge.

According to one exemplary embodiment of the invention, the second light module is arranged so that the second, pixelated light beam is a light beam comprising a plurality of pixels, for example 500 pixels of dimensions of between 0.05° and 0.3°, which are distributed over a plurality of rows and columns, for example 20 rows and 25 columns. For example, the second light module may comprise a plurality of elementary light sources and an optical device arranged to emit said second, pixelated light beam together. Where applicable, the controller may be arranged to selectively control each of the elementary light sources of the second light module so that this light source emits an elementary light beam forming one of the pixels of the pixelated light beam. What is meant by "light source" is any light source optionally associated with an electro-optical element, which is capable of being selectively activated and controlled so as to emit an elementary light beam, the light intensity of which is controllable. It may, in particular, be a light-emitting semiconductor chip, a light-emitting element of a monolithic pixelated light-emitting diode, a portion of a light-converting element which may be excited by a light source or indeed a light source associated with a liquid crystal or with a micromirror.

Another subject of the invention is a method for controlling a lighting system as claimed in one of the preceding claims, the method comprising the following steps:

a. Receiving an instruction to emit a given light function:

b. Controlling the adjustment system so as to cause a simultaneous modification of the vertical orientation of the first and second lighting beams depending on said instruction;

c. Controlling the second light module so as to emit a second, pixelated lighting beam having predetermined characteristics depending on said instruction.

The present invention is now described using examples which only illustrate and in no way limit the scope of the invention, and on the basis of the appended drawings, in which drawings the various figures show:

FIG. 1 schematically and partially shows a lighting system according to one embodiment of the invention;

FIG. 2 schematically and partially shows a method for controlling the lighting system of FIG. 1;

FIG. 3 schematically and partially shows a first light function realized by the lighting system of FIG. 1 controlled by means of the method of FIG. 2;

FIG. 4 schematically and partially shows a second light function realized by the lighting system of FIG. 1 controlled by means of the method of FIG. 2; and FIG. 5 schematically and partially shows a second light function realized by the lighting system of FIG. 1 controlled by means of the method of FIG. 2.

In the following description, elements which are identical in structure or in function and appear in various figures keep the same reference sign, unless otherwise stated.

FIG. 1 shows a partial view of a lighting system 1 of a motor vehicle according to one embodiment of the invention.

The lighting system 1 comprises a headlamp 11 in which a first light module 2 comprising a light source 21 and an optical device 22 is arranged, the first module 2 being able to emit a first lighting beam F having a substantially flat cutoff.

The headlamp 11 comprises a second light module 3. The light module 3 comprises, in particular, a pixelated light source 31 associated with a lens 32. In the example described, the pixelated light source 31 is a monolithic pixelated light-emitting diode, each of the light-emitting elements of which forms an elementary light source $31_{i,j}$ which may be activated and controlled selectively by an integrated controller so as to emit light toward the lens 32, which thus projects an elementary light beam $HD_{i,j}$ onto the road, the light intensity of which is controllable. Each elementary light beam $HD_{i,j}$ is projected by the lens into a given emission cone, defined by a given emission direction and a given angular aperture. Thus, in the example described, all of the elementary light beams $HD_{i,j}$ thus form a second, pixelated lighting beam HD having 500 pixels which are distributed over 25 columns and 20 rows, extending in an emission area ZE defined horizontally by an angular range of 7.5° and vertically by an angular vertical range of 6° and each pixel of which is formed by one of these elementary light beams $HD_{i,j}$. Each elementary light beam $HD_{i,j}$ emitted by one of the elementary light sources $31_{i,j}$ of the source 31 has a horizontal and vertical aperture of less than 1°, for example of 0.3°.

In the example described, the first lighting beam F is a non-pixelated beam, and the first and second light modules 2 and 3 are arranged so that the emission area ZE of the second light beam HD extends below and above the flat cutoff of the first light beam F.

The first light module 2 and the second light module 3 are mounted on the same support plate 41 mounted so as to be able to rotate in the headlamp 11 about a horizontal axis Y. The headlamp 11 comprises a mechanical adjustment system comprising an actuator 42 which is connected to said support plate 41 and capable of causing a rotation of the support plate 41 about the axis Y. It is understood that, when the support plate 41 pivots about the axis Y, the vertical orientation of the first and second lighting beams F and HD is then modified simultaneously.

The lighting system 1 comprises a computer 12 of the motor vehicle, receiving various data, in particular originating from various sensor systems of the motor vehicle, such as, in particular, the speed of the motor vehicle or indeed the presence of road users downstream of the motor vehicle. The computer 12 is arranged to issue, depending on these received data, instructions for a given light function to be emitted, by the headlamp 11.

The headlamp 11 comprises a controller 5, receiving the instructions issued by the computer 12. This controller 5 is arranged to determine, on the basis of an instruction to emit a given light function received from the computer 12, an angular setpoint for the vertical orientation of the lighting beams F and HD and a light intensity setpoint for the first lighting beam F. The controller 5 is also arranged to generate, depending on this received instruction, a digital image realizing a portion of said given light function in a frame, the dimensions and the resolution of which correspond to those of the emission area ZE of the second, pixelated lighting beam HD.

The controller 5 is thus arranged to control the actuator 42 so as to cause a rotation of the plate 42 according to the determined angular setpoint, so as to cause a simultaneous modification of the vertical orientation of the first and second lighting beams F and HD toward this setpoint.

The controller 5 is also arranged to control the emission, by the first light module 2, of the first lighting beam F according to the determined light intensity setpoint.

The controller 5 is also arranged to send the generated digital image to the integrated controller of the pixelated light source 31. This integrated controller then selectively controls each of the elementary light sources $31_{i,j}$ so as to turn on, turn off and/or modify the light intensity of the elementary light beam $HD_{i,j}$ which this source may emit, so that this elementary lighting beam reproduces the pixel of the digital image associated with this source on the road. The second, pixelated lighting beam HD thus reproduces the digital image generated in the emission area ZE.

FIG. 2 shows a method for controlling the lighting system 1 according to one embodiment of the invention. This method will be described, in connection with FIG. 3 and FIG. 4 and FIG. 5, which each describe, on the left, a projection onto a screen of the lighting beams F and HD emitted by the headlamp 11 and, on the right, a top view of a road scene, for three different light functions realized upon implementation of the method of FIG. 2.

In a step E1, the computer 12 generates, on the basis of data received, an instruction to emit a given light function $F_i$. In the example of FIG. 3, it is a low-beam mode anti-dazzling high-beam lighting function $F_1$ to be emitted when the speed of the vehicle is greater than 60 km/h and a large number of road users not to be dazzled has been detected. It should be noted that, in the case of FIG. 3, the instruction to emit the function $F_1$ requires, in addition, the generation, in a ground writing area RW, of two horizontal white bands materializing a warning of a risk of collision with an obstacle located downstream of the motor vehicle. In the example of FIG. 4, it is a low-beam lighting function $F_2$ to be emitted when the speed of the vehicle is between 30 km/h and 60 km/h and at least one road user not to be dazzled has been detected. The instruction to emit the function $F_2$ requires, in addition, the generation, in a ground writing area RW, of three horizontal white bands materializing a warning of a risk of collision with an obstacle located downstream of the motor vehicle. Finally, in the case of FIG. 5, it is an urban lighting function $F_3$ to be emitted when the speed of the vehicle is less than 30 km/h. The instruction to emit the function $F_3$ requires, in addition, the generation, in a ground writing area RW, of two vertical white bands materializing a size of the motor vehicle making it possible for the driver to realize a maneuver with precision. It should be noted that the functions cited above are listed by way of indication, and that the computer 12 may generate instructions for other types of light functions to be emitted by the headlamp 11.

The controller 5 determines, in a step E11, on the basis of the instruction to emit the function $F_i$, an angular setpoint $\theta_i$ for the vertical orientation of the lighting beams F and HD making it possible to realize the function $F_i$. Then, in a step E21, the controller 5 controls the actuator 42 of the adjustment system so as to cause a rotation of the plate 41 about the axis Y and modify the vertical orientation of the first and second lighting beams F and HD toward this angular setpoint $\theta_i$. In the examples described, the angular setpoints $\theta_i$ define the position of the substantially flat cutoff FC of the first lighting beam F with respect to a horizon line H-H and are $-0.57°$ for the low-beam mode anti-dazzling high-beam lighting function of FIG. 3, $-1.57°$ for the low-beam lighting function of FIG. 4 and $-2.57°$ for the urban lighting function of FIG. 5, respectively.

In other words, when the computer 12 requires, for example, the emission of a low-beam lighting function $F_2$, while the headlamp 11 is emitting the low-beam mode anti-dazzling high-beam lighting function $F_1$, as shown in FIG. 3, the controller 5 determines the value of the angular setpoint $\theta_2$, namely $-1.57°$, and controls the actuator 42 so as to cause a modification of the vertical orientation of the lighting beams F and HD by $-1°$. This modification results in a lowering by $1°$ of the cutoff FC of the first lighting beam F and in a repositioning by $-1°$ of the emission area ZE of the second, pixelated lighting beam HD, as shown in FIG. 4. From the driver's point of view, the emission area ZE thus gets 4 meters closer to the motor vehicle.

Likewise, when the computer 12 requires, for example, the emission of an urban lighting function $F_3$, while the headlamp 11 is emitting a low-beam lighting function $F_2$, as shown in FIG. 4, the controller 5 determines the value of the angular setpoint $\theta_3$, namely $-2.57°$, and controls the actuator 42 so as to cause a modification of the vertical orientation of the lighting beams F and HD by $-1°$. This modification results in a lowering by $1°$ of the cutoff FC of the first lighting beam F and in a repositioning by $-1°$ of the emission area ZE of the second, pixelated lighting beam HD. From the driver's point of view, the emission area ZE thus gets 3 meters closer to the motor vehicle.

In the step E21, the modification of the vertical orientation of the first and second lighting beams is realized according to a control law $L(\theta)$ defining a movement speed setpoint for the lighting beams F and HD between their initial vertical orientation $\theta_{i-1}$ and said angular setpoint $\theta_i$. In the example described, the control law $L(\theta)$ is such that the plate 41 pivots, at the start of travel, with a gradual acceleration, then with a constant speed, and, at the end of travel, with a gradual deceleration.

Simultaneously, the controller 5 determines, in a step E12, a light intensity setpoint $I_i$ for the first lighting beam F making it possible to realize the function $F_i$. Then, in a step E22, the controller 5 controls the first light module 2, and more specifically its light source 21, so that the light intensity of the first lighting beam F is compliant with this setpoint $I_i$. In the examples described, the light intensity setpoints $I_i$ are determined as a percentage of the nominal light intensity which may be emitted by the light source 21, and are 100% for the low-beam mode anti-dazzling high-beam lighting function of FIG. 3, 75% for the low-beam lighting function of FIG. 4 and 50% for the urban lighting function of FIG. 5, respectively.

Also simultaneously, in a step E13, the controller 5 generates a sequence of digital images $Im_j(F_{i-1}, F_i)$ making it possible for the second, pixelated lighting beam HD to transition from the light function $F_{i-1}$ previously emitted to the new function $F_i$.

More specifically, the sequence of digital images $Im_j(F_{i-1}, F_i)$ is generated so that, on the one hand, the position of an upper cutoff HDC in the second lighting beam HD defined for the light function $F_{i-1}$ remains substantially constant during the modification of the vertical orientation of the first and second lighting beams F and HD of the step E21. To these ends, the position of the cutoff HDC defined in each digital image $Im_j(F_{i-1}, F_i)$ generated by the controller 5 moves with respect to the position of the cutoff HDC defined in the digital image $Im_j(F_{i-1}, F_i)$ previously generated, in an opposite direction to that of the modification of the vertical orientation determined in the step E11. In this way, the digital movement of this cutoff HDC counterbalances the mechanical modification of the vertical orientation of the emission area ZE, so that the position of the cutoff HDC remains substantially identical over the course of this mechanical modification.

In FIG. 3, the second, pixelated lighting beam HD is delimited, in the emission area ZE, by a cutoff HDC having a first, substantially flat portion aligned with the substantially flat cutoff FC of the first lighting beam and a second, substantially flat portion positioned above the substantially flat cutoff, the first and second portions being connected by a, in particular oblique, projection. It may thus be seen, in FIG. 4 and FIG. 5, that, although the substantially cutoff FC does indeed undergo a mechanical reorientation, the cutoff HDC, in contrast, remains in the same position, namely −0.57°, which makes it possible for the overall beam formed by the meeting of the lighting beams F and HD to remain compliant with the regulatory requirements surrounding the presence of an upper cutoff in a lighting beam, including during this mechanical reorientation.

On the other hand, the sequence of digital images $Im_j(F_{i-1}, F_i)$ is generated, by operations of morphing and/or translating the digital image $Im(F_{i-1})$ which made it possible to realize the light function $F_{i-1}$ previously emitted toward the digital image $Im(F_i)$ which makes it possible to realize the new function $F_i$.

It may be seen, for example, that, in FIG. 3, the digital image $Im(F_1)$ defines a second, pixelated lighting beam HD extending horizontally only partially in the emission area ZE, with a specific cutoff HDC, as explained above, and comprising two horizontal bands which are provided in the display area RW. In FIG. 4, the digital image $Im(F_2)$ defines a second, pixelated lighting beam HD extending horizontally entirely in the emission area ZE, with the same specific cutoff HDC, and comprising three horizontal bands which are provided in the display area RW. The sequence of digital images $Im_j(F_1, F_2)$ making the transition of the function $F_1$ of FIG. 3 toward the function $F_2$ of FIG. 4 possible is thus generated by an operation of morphing and/or translating the digital image $Im(F_1)$ which made it possible to realize the light function $F_1$ previously emitted toward the digital image $Im(F_2)$ which makes it possible to realize the new function $F_2$.

Similarly, in FIG. 5, the digital image $Im(F_3)$ defines a second, pixelated lighting beam HD extending horizontally entirely in the emission area ZE, with a substantially flat specific cutoff HDC, and comprising two vertical bands which are provided in the display area RW. The sequence of digital images $Im_j(F_2, F_3)$ making the transition of the function $F_2$ of FIG. 4 toward the function $F_3$ of FIG. 5 possible is thus generated by an operation of morphing and/or translating the digital image $Im(F_2)$ which made it possible to realize the light function $F_2$ previously emitted toward the digital image $Im(F_3)$ which makes it possible to realize the new function $F_3$.

In a step E23, each of the digital images in the sequence of digital images $Im_j(F_{i-1}, F_i)$ is transmitted to the integrated controller of the pixelated light source 31, synchronously with the control of the actuator 42 of the step E21, the first image in the sequence being transmitted at the start of the modification of the vertical orientation and the last image in the sequence being transmitted at the end of this modification of the vertical orientation. Thus, the integrated controller then selectively controls each of the elementary light sources 31$_{i,j}$ so that the second, pixelated lighting beam HD thus reproduces each digital image in the sequence of digital images $Im_j(F_{i-1}, F_i)$ in the emission area ZE, during the movement of this emission area ZE.

The foregoing description clearly explains how the invention makes it possible to achieve the objectives it set itself, and in particular by proposing a lighting system of a vehicle integrating a first light module which may emit a lighting beam having a flat upper cutoff and a second light module which may emit a pixelated lighting beam, the vertical orientation of the two beams and the pixelated lighting beam being controlled simultaneously depending on the type of light function which there is a desire to emit, so that it is possible to adjust the vertical orientation while at the same time maintaining the ability of the lighting system to emit regulatory light functions.

In any event, the invention should not be regarded as being limited to the embodiments specifically described in this document, and extends, in particular, to any equivalent means and to any technically operative combination of these means. In particular, types of light module other than that described may be envisaged, and in particular a light module comprising a combination of a light source and a grid of micromirrors which may be activated selectively. It is also possible to envisage controlling the lighting system so as to emit light functions other than those which have been described, and in particular highway or unfavorable meteorological condition lighting functions, or indeed light functions in which other types of pictogram or ground markings are provided. It is also possible to envisage arranging the modules on two different plates, each equipped with a dedicated adjustment actuator.

The invention claimed is:

1. A lighting system of a motor vehicle, comprising:
   a first light module which is able to emit a first lighting beam with an upper cutoff,
   a second light module which is able to emit a second, pixelated lighting beam,
   a system for mechanically adjusting vertical orientation of the first and second light beams and a controller which is able to receive an instruction to emit a given light function and arranged to control the adjustment system so as to cause a simultaneous modification of the vertical orientation of the first and second lighting beams depending on said instruction, during said simultaneous modification, to maintain an upper cutoff of the second, pixelated lighting beam at a constant position relative to a scene, and to control the second light module so as to emit a second, pixelated lighting beam having predetermined characteristics depending on said instruction.

2. The lighting system as claimed in claim 1, in which the first light module and the second light module are mounted on the same support plate, the mechanical adjustment system comprising an actuator which is connected to said support plate and able to cause a movement of the support plate, the controller being arranged to control, depending on said instruction, said actuator so as to cause a movement of the plate causing a simultaneous modification of the vertical orientation of the first and second lighting beams.

3. A lighting system of a motor vehicle, comprising a first light module which is able to emit a first lighting beam with an upper cutoff, a second light module which is able to emit a second, pixelated lighting beam, a system for mechanically adjusting vertical orientation of the first and second light beams and a controller which is able to receive an instruction to emit a given light function and arranged to control the adjustment system so as to cause a simultaneous modification of the vertical orientation of the first and second lighting beams depending on said instruction and to control the second light module so as to emit a second, pixelated lighting beam having predetermined characteristics depending on said instruction, wherein the mechanical adjustment system comprising:

a first actuator, which is connected to the first light module and able to cause a movement of the first light module, and a second actuator, which is connected to the second light module and able to cause a movement of the second light module, the controller being arranged to control, depending on said instruction, the first and second actuators so as to cause a simultaneous movement of the first and second light modules causing a simultaneous modification of the vertical orientation of the first and second lighting beams.

4. The lighting system as claimed in claim 1, in which the controller is arranged to control, depending on said instruction, the first light module so as to modify the light intensity of the first lighting beam according to a predetermined setpoint depending on said instruction.

5. The lighting system as claimed in claim 1, in which the second light module is able to emit a second, pixelated lighting beam in an emission area, and in which the controller is arranged to control, depending on said instruction, the second light module so as to emit a pixelated lighting beam, a profile, a photometry and/or the position in the emission area of which is predetermined depending on said instruction.

6. The lighting system as claimed in claim 5, in which the controller is able to selectively receive at least an instruction to emit a non-dazzling high-beam lighting beam, an instruction to emit a low-beam lighting beam and an instruction to emit an urban lighting beam, and in which:

a. Upon receipt of an instruction to emit a non-dazzling high-beam lighting beam, the controller is arranged to control the adjustment system so as to cause a simultaneous modification of the vertical orientation of the first and second lighting beams, so that the upper cutoff of the first lighting beam is positioned substantially at an angle of −0.57° with respect to a horizon line;

b. Upon receipt of an instruction to emit a low-beam lighting beam, the controller is arranged to control the adjustment system so as to cause a simultaneous modification of the vertical orientation of the first and second lighting beams, so that the upper cutoff of the first lighting beam is positioned substantially at an angle of −1.57° with respect to a horizon line;

c. Upon receipt of an instruction to emit an urban lighting beam, the controller is arranged to control the adjustment system so as to cause a simultaneous modification of the vertical orientation of the first and second lighting beams, so that the upper cutoff of the first lighting beam is positioned substantially at an angle of −2.57° with respect to a horizon line.

7. A lighting system of a motor vehicle, comprising a first light module which is able to emit a first lighting beam with an upper cutoff, a second light module which is able to emit a second, pixelated lighting beam, a system for mechanically adjusting vertical orientation of the first and second light beams and a controller which is able to receive an instruction to emit a given light function and arranged to control the adjustment system so as to cause a simultaneous modification of the vertical orientation of the first and second lighting beams depending on said instruction and to control the second light module so as to emit a second, pixelated lighting beam having predetermined characteristics depending on said instruction, wherein when the controller controls the second light module so as to emit a second, pixelated lighting beam, referred to as initial, having an upper cutoff, and receives an instruction to emit a new given light function, the controller is arranged to control the second light module so as to emit a second, pixelated lighting beam having an upper cutoff, the position of which remains constant and identical to that of the initial second, pixelated lighting beam while it controls the adjustment system so as to cause a simultaneous modification of the vertical orientation of the first and second lighting beams depending on said instruction.

8. The lighting system as claimed in claim 1, in which, when the controller controls the second light module so as to emit a second, pixelated lighting beam, referred to as initial, and receives an instruction to emit a new given light function, the controller is arranged to control the second light module so as to emit a second, pixelated lighting beam on the basis of a digital image $(Imj(Fi-1, Fi)$ obtained by a morphing and/or a translation of a digital image $(Im(Fi-1))$ corresponding to the initial second, pixelated lighting beam, while it controls the adjustment system so as to cause a simultaneous modification of the vertical orientation of the first and second lighting beams depending on said instruction.

9. The lighting system as claimed in claim 1, in which, upon receipt of an instruction to emit a given light function, the controller is arranged to control, depending on said instruction, the adjustment system so as to cause a simultaneous modification of the vertical orientation of the first and second lighting beams according to a control law having a variable speed.

10. A method for controlling a lighting system as claimed in claim 1, the method comprising the following steps:

a. Receiving an instruction to emit a given light function:

b. Controlling the adjustment system so as to cause a simultaneous modification of the vertical orientation of the first and second lighting beams depending on said instruction;

c. Controlling the second light module so as to emit a second, pixelated lighting beam having predetermined characteristics depending on said instruction.

11. The lighting system as claimed in claim 2, in which the controller is arranged to control, depending on said instruction, the first light module so as to modify the light intensity of the first lighting beam according to a predetermined setpoint depending on said instruction.

12. The lighting system as claimed in claim 2, in which the second light module is able to emit a second, pixelated lighting beam in an emission area, and in which the controller is arranged to control, depending on said instruction, the second light module so as to emit a pixelated lighting beam, a profile, a photometry and/or the position in the emission area of which is predetermined depending on said instruction.

13. The lighting system as claimed in claim 2, in which, when the controller controls the second light module so as to emit a second, pixelated lighting beam, referred to as initial, having an upper cutoff, and receives an instruction to emit a new given light function, the controller is arranged to control the second light module so as to emit a second, pixelated lighting beam having an upper cutoff, the position of which remains constant and identical to that of the initial second, pixelated lighting beam while it controls the adjustment system so as to cause a simultaneous modification of the vertical orientation of the first and second lighting beams depending on said instruction.

14. The lighting system as claimed in claim 2, in which, when the controller controls the second light module so as to emit a second, pixelated lighting beam, referred to as initial, and receives an instruction to emit a new given light function, the controller is arranged to control the second light module so as to emit a second, pixelated lighting beam on the basis of a digital image (Imj(Fi−1, Fi) obtained by a morphing and/or a translation of a digital image (Im(Fi−1)) corresponding to the initial second, pixelated lighting beam, while it controls the adjustment system so as to cause a simultaneous modification of the vertical orientation of the first and second lighting beams depending on said instruction.

15. The lighting system as claimed in claim 2, in which, upon receipt of an instruction to emit a given light function, the controller is arranged to control, depending on said instruction, the adjustment system so as to cause a simultaneous modification of the vertical orientation of the first and second lighting beams according to a control law having a variable speed.

16. A method for controlling a lighting system as claimed in claim 2, the method comprising the following steps:

a. Receiving an instruction to emit a given light function:

b. Controlling the adjustment system so as to cause a simultaneous modification of the vertical orientation of the first and second lighting beams depending on said instruction;

c. Controlling the second light module so as to emit a second, pixelated lighting beam having predetermined characteristics depending on said instruction.

17. The lighting system as claimed in claim 3, in which the controller is arranged to control, depending on said instruction, the first light module so as to modify the light intensity of the first lighting beam according to a predetermined setpoint depending on said instruction.

18. The lighting system as claimed in claim 3, in which the second light module is able to emit a second, pixelated lighting beam in an emission area, and in which the controller is arranged to control, depending on said instruction, the second light module so as to emit a pixelated lighting beam, a profile, a photometry and/or the position in the emission area of which is predetermined depending on said instruction.

19. The lighting system as claimed in claim 3, in which, when the controller controls the second light module so as to emit a second, pixelated lighting beam, referred to as initial, having an upper cutoff, and receives an instruction to emit a new given light function, the controller is arranged to control the second light module so as to emit a second, pixelated lighting beam having an upper cutoff, the position of which remains constant and identical to that of the initial second, pixelated lighting beam while it controls the adjustment system so as to cause a simultaneous modification of the vertical orientation of the first and second lighting beams depending on said instruction.

20. The lighting system as claimed in claim 3, in which, when the controller controls the second light module so as to emit a second, pixelated lighting beam, referred to as initial, and receives an instruction to emit a new given light function, the controller is arranged to control the second light module so as to emit a second, pixelated lighting beam on the basis of a digital image (Imj(Fi−1, Fi) obtained by a morphing and/or a translation of a digital image (Im(Fi−1)) corresponding to the initial second, pixelated lighting beam, while it controls the adjustment system so as to cause a simultaneous modification of the vertical orientation of the first and second lighting beams depending on said instruction.

* * * * *